Patented Oct. 11, 1949

2,484,760

UNITED STATES PATENT OFFICE 2,484,760

POLYMERIZATION OF VINYLIDENE CHLORIDE COPOLYMERS

Hanns Peter Staudinger, Ewell, and Donald Faulkner, Cambridge, England, assignors to The Distillers Company, Limited, Edinburgh, Scotland, a British company No Drawing. Application September 4, 1945, Serial No. 614,446. In Great Britain August 18, 1944

Section 1, Public Law 690, August 8, 1946
Patent expires August 18, 1964

6 Claims. (Cl. 260—80.5)

This invention is for improvements in or relating to products from the polymerisation of vinylidene chloride and is concerned with the production of copolymers of vinylidene chloride with isobutene.

In copending application Serial No. 551,632, filed August 28, 1944, there is described the preparation of a co-polymer of vinylidene chloride with isobutene resulting in a product capable of being moulded, extruded and stretched without the necessity of chilling as is stated in prior British specification No. 532,697 to be required with polyvinylidene chloride itself. These co-polymers are, in addition, of improved heat stability. It has been stated in the examples of the said copending application that the viscosity of a 0.4% by weight solution in cyclohexanone of the product compared with the viscosity of the pure solvent at 25° C. shows a ratio of the order of 1.094 to 1.097. This ratio of viscosity, known as "relative viscosity," can be used to indicate the relative molecular weights of polymers and enables a comparison of the molecular complexity of different polymers to be made. In many cases it is desirable to produce copolymers which, although still soluble in cyclohexanone have a higher molecular complexity as expressed by the higher relative viscosity measurement. We have now found that co-polymerisation products of vinylidene chloride can be obtained from mixtures of vinylidene chloride, isobutene and a third polymerisable compound and that these products have higher relative viscosities as compared with the products obtained by the process described in the co-pending application Serial No. 551,632. Further, the mechanical properties of the products obtained by the use of a third polymerisable compound are superior to those of the products of co-pending application Serial No. 551,632. It was observed that threads or moulded discs obtained from certain of the latter products had a tendency to become brittle on prolonged storage and we believe that this is due in part to the low molecular complexity of these products. The products of higher relative viscosity obtained from mixtures of vinylidene chloride, isobutene and a third polymerisable compound afford threads and moulded discs which do not become brittle on storage. In addition, those products display increased compatibility with common plasticisers such as tricresyl phosphate.

According to the present invention, there is provided a process for the production of a copolymer of vinylidene chloride which comprises subjecting a mixture of vinylidene chloride and isobutene together with a third polymerisable compound capable of copolymerisation therewith to the action of heat and/or actinic light in the presence of a peroxidic catalyst or catalysts. In addition, an activating agent, such as sodium sulphite, may be added to the reaction mixture. The co-polymerisation may be satisfactorily effected in aqueous emulsion or dispersion in the manner described in co-pending application Serial No. 551,632 referred to above. As peroxidic catalysts we may use the organic peroxides such as the aliphatic or aromatic peroxides, or the persalts.

Thus, for example, the copolymerisation of vinylidene chloride/isobutene mixtures with acrylonitrile, methacrylonitrile, ethyl acrylate, methyl methacrylate, ethyl and butyl alpha-chloroacrylates, vinyl acetate, methyl-vinyl ketone, and methyl-isopropenyl ketone give products which show these improved characteristics. We find that compositions in which the combined amount of isobutene and the third component does not exceed 30% by weight of the final ternary copolymer are particularly suitable for the purpose of moulding and extrusion. The amount of isobutene in the copolymer should not be less than 10% by weight of the third component. The following examples illustrate the manner in which the present invention may be carried into effect.

EXAMPLE 1

Two experiments were carried out in sealed glass tubes, which were rotated end-over-end in a waterbath maintained at 30° C., each tube containing an emulsion formed from the following two phases:

Oil phase

| | Grams |
|---|---|
| Vinylidene chloride | 17 |
| Isobutene | 2.12 |
| Acrylonitrile | 1 |
| Crotonyl peroxide | 0.015 |

Aqueous phase

| | | |
|---|---|---|
| A 0.5% by weight aqueous solution of the sodium salt of sulphated lauryl alcohol | cc | 30 |
| Sodium sulphite crystals | grams | 0.6 |
| Glacial acetic acid | cc | 1.5 |
| Ammonium persulphate | grams | 0.10 |

These sealed tubes were taken out of the waterbath after different periods of time and the copolymers were isolated from the reaction mixture by precipitation with aluminium sulphate. Examination of the co-polymers gave the following results:

|  | Tube A | Tube B |
|---|---|---|
| Isobutene of total___per cent__ | 10.5 | 10.5 |
| Weight of co-polymer___grams__ | 1.16 | 3.22 |
| Yield (by weight)___per cent__ | 5.8 | 16.1 |
| Time of heating___hours__ | 24 | 72 |
| Relative viscosity of co-polymer__ | 1.20 | 1.18 |
| Analysis of co-polymer: |  |  |
| Chlorine content___per cent__ | 60.0 | 62.2 |
| Nitrogen content___do____ | 3.0 | 2.6 |
| Vinylidene chloride in co-polymer__do____ | 81.9 | 85.0 |
| Acrylonitrile___do____ | 11.4 | 9.9 |
| Isobutene___do____ | 6.7 | 5.1 |

These co-polymers were tested by pressing the heated polymer through a glass tube having a capillary of 1 mm. diameter formed at the one end. It was found necessary to heat the co-polymer to 150° C. before it could be extruded under 50 lbs. pressure. The extruded thread can be drawn, whilst hot, into a thinner filament.

A composition of the second of the above co-polymers, with 10% of its weight of plasticiser, was pressed at 180° C. to give a clear, very pale yellow disc which did not develop brittleness on prolonged storage.

EXAMPLE 2

A mixture containing 85% by weight of vinylidene chloride, 10% by weight of isobutene and 5% by weight of ethyl acrylate was used. The mixture was made up by emulsifying the following phases:

*Oil phase*

|  | Grams |
|---|---|
| Vinylidene chloride | 17 |
| Isobutene ___approx__ | 2 |
| Ethyl acrylate | 1 |
| Crotonyl peroxide | 0.015 |

*Aqueous phase*

| | |
|---|---|
| A 0.5% by weight aqueous solution of the sodium salt of sulphated lauryl alcohol cc__ | 30 |
| Sodium sulphite crystals___grams__ | 0.6 |
| Glacial acetic acid___cc__ | 1.5 |
| Ammonium persulphate___gram__ | 0.015 |

Two glass tubes were each filled with the mixture, sealed and rotated end-over-end in a water-bath maintained at 30° C. They were taken out after different periods of time and the co-polymers, after isolation by precipitation with aluminium sulphate, were examined, when the following results were obtained (Tube A having contained 2.02 grams and Tube B having contained 2.07 grams, respectively of isobutene).

|  | Tube A | Tube B |
|---|---|---|
| Isobutene of total___per cent__ | 10.1 | 10.3 |
| Weight of co-polymer___grams__ | 10.09 | 15.75 |
| Yield (by weight)___per cent__ | 50.4 | 78.6 |
| Time of heating___hours__ | 23 | 93 |
| Relative viscosity of co-polymer__ | 1.19 | 1.16 |
| Analysis of co-polymer: |  |  |
| Chlorine content___per cent__ | 65.0 | 64.9 |
| Carbon content___do____ | 29.6 | 30.6 |
| Hydrogen content___do____ | 2.9 | 3.3 |
| Vinylidene chloride in co-polymer__do____ | 88.8 | 88.6 |
| Ethyl acrylate___do____ | 7.4 | 4.0 |
| Isobutene___do____ | 3.8 | 7.3 |

The figures given above for the amounts of ethyl acrylate and isobutene in the co-polymers have been calculated from the carbon content, after calculating the proportion of vinylidene chloride from the chlorine content.

These co-polymers were tested in a similar way to that described in Example 1 and were found to exhibit good flow properties making them particularly useful for moulding purposes.

EXAMPLE 3

A mixture containing 85% by weight of vinylidene chloride, 10% by weight of isobutene and 5% by weight of n-butyl alpha-chloracrylate was polymerised in the manner described in Example 2. After 96 hours heating at 30° C., the mixture afforded an 85.6% yield of co-polymer having a relative viscosity of 1.13. Elementary analysis of the co-polymer showed it to contain 87.9% of vinylidene chloride, 7.4% of butyl chloracrylate and 4.7% of isobutene. A disc pressed from a composition of the co-polymer with 10% of its weight of plasticiser was very similar in properties to the disc from the co-polymers of Example 2, but was much lighter in colour.

What we claim is:

1. As a composition of matter, a copolymer of vinylidene chloride, isobutene and a polymerisable aliphatic monoethenic compound of the formula $CH_2=CR_1R_2$ where $R_1$ is selected from the group consisting of hydrogen, methyl and chlorine, and $R_2$ is selected from the group consisting of nitrile, lower alkyl carboxy ester, acetoxy and methyl keto radicals, wherein the isobutene and the polymerisable compound together constitute not more than 30% by weight of the copolymer and wherein the isobutene content is at least 10% of that of said polymerisable compound.

2. A copolymer as described in claim 1, wherein $R_1$ is hydrogen and $R_2$ is a lower alkyl carboxy ester radical.

3. A copolymer as described in claim 1, wherein said compound is acrylonitrile.

4. As a composition of matter, a copolymer of vinylidene chloride, isobutene and a polymerisable aliphatic monoethenic compound of the formula $CH_2=CH_1R_2$ where $R_1$ is selected from the group consisting of hydrogen, methyl and chlorine, and $R_2$ is selected from the group consisting of nitrile, lower alkyl carboxy ester, acetoxy and methyl keto radicals, said copolymer containing 80 to 90% by weight of vinylidene chloride, 3 to 8% by weight of isobutene and the remainder being said polymerisable compound.

5. A copolymer as described in claim 4, wherein $R_1$ is hydrogen and $R_2$ is a lower alkyl carboxy ester radical.

6. As a composition of matter, a copolymer of vinylidene chloride, isobutene and acrylonitrile, said copolymer containing 80 to 90% by weight of vinylidene chloride, 3 to 8% by weight of isobutene and the remainder being acrylonitrile.

HANNS PETER STAUDINGER.
DONALD FAULKNER.

REFERENCES CITED

The following references are of record in the file of this patent:

UNITED STATES PATENTS

| Number | Name | Date |
|---|---|---|
| 2,278,415 | Arnold | Apr. 7, 1942 |
| 2,328,510 | Thomas | Aug. 31, 1943 |
| 2,388,138 | Greenewalt | Oct. 30, 1945 |
| 2,397,260 | Hanford et al. | Mar. 26, 1946 |